United States Patent [19]

Takata

[11] 3,800,927
[45] Apr. 2, 1974

[54] ONE WAY CLUTCH
[75] Inventor: Nobuo Takata, Osaka, Japan
[73] Assignee: Toskin Seiki Co., Ltd.
[22] Filed: Sept. 7, 1972
[21] Appl. No.: 287,097

[30] Foreign Application Priority Data
June 14, 1972 Japan............................. 47-58620

[52] U.S. Cl. ................................................. 192/45
[51] Int. Cl. ........................................... F16d 41/07
[58] Field of Search................... 192/45; 188/82.84

[56] References Cited
UNITED STATES PATENTS
1,834,843  12/1931  Humfrey................................. 192/45
1,670,197  5/1928   Humfrey................................. 192/45
3,187,863  6/1965   Giometti................................. 192/45
3,403,762  10/1968  Auriol................................... 192/45
3,557,921  1/1971   Takada................................. 192/45

Primary Examiner—Allan D. Herrmann
Attorney, Agent, or Firm—Hill, Sherman, Meroni, Gross & Simpson

[57] ABSTRACT

This invention is to provide a novel one-way clutch mechanism arranged characteristically such that a clutch ring so shaped as to be gradually increased in thickness from one side to the other is inserted between the inner and outer races through the media of sprag means inclined at a given angle relative to the axis of said inner and outer races, whereby the axial movements of said sprag means caused in conversion from and to the clutch action and the rolling action are all absorbed by said clutch ring.

5 Claims, 6 Drawing Figures

ONE WAY CLUTCH

The heretofore device one-way clutches include the following two types: the type (type A) in which, in order to check relative rotation of the inner and outer races, a part of the periphery of the cylindrical body of each sprag is deformed or a spring is mounted on each sprag or otherwise the cylindrical clutching face of the inner or outer race deformed, so as to integrately join the inner and outer races by utilizing the frictional force combined with the wedging action offered by the sprags arranged in plurality between the inner and outer races, and the type (type B) in which the sprags and inner and outer races are arranged to form a plane of rotation of a suitable line when they are rotated about their axes, and the sprags are arranged with their axes inclined relative to the axes of the inner and outer races, so that when they are rotated in one direction, the sprags will attract the inner and outer races by the frictional force developed by said sprags to thereby integrate said both inner and outer races.

However, type A had the drawbacks that slippage takes place between the sprags and the clutching faces of the inner and outer races during idling of the inner race to promote wear, that since the clutching action is effected impulsively, there is high possibility of causing damage to the sprags and to the clutching faces of the inner and outer races, that high machining accuracy is required for working of the peripheral faces of the sprags, for mounting of springs and for machining of the clutching faces of the inner and outer races so that all the sprags may participate uniformly in developing the desired clutching action, and that high precision bearings must be prepared to sustain load during idling and to ensure uniform clutching performance when the clutch is applied.

On the other hand, the type B clutches, although able to substantially overcome the defects of type A, depend on the axial drawing or attracting action of the sprags against the inner and outer races for integrally uniting the latter. This necessarily requires a structure that enables axial movement of the inner or outer race to be clutched.

Further, since the sprags and the clutching faces of the inner and outer races, when assembled into a clutch, have respectively a certain curvature of rotation relative to the axis, the inner and outer races are made in sets. Moreover, a spline shaft or a sliding key must be provided on the inner or outer race on cope with the axial drawing action exerted to the outer race. Even if such spline shaft or sliding key is provided, expansion and contraction take place inevitably in the outer and the inner races, respectively, since the former receives a large internal pressure and the latter a large external pressure when the clutch is applied. Should expansion or contraction take place on the side where the spline shaft or sliding key is provided, an "interference fit" situation may be developed to hinder the axial movement of the races, so that a sufficient wall thickness to get rid of such possibility is required. This naturally necessitates increased amount of material and space, resulting in a large-sized clutch for a certain prescribed amount of torque.

The present invention has been deviced with the object of sweeping away all of these defects of both type A and type B clutches which have been available heretofore.

More specifically, there is provided according to the present invention an improved one-way clutch arrangement in which a clutch ring so shaped as to be gradually increased in thickness from one side to the other is inserted between the inner and outer races in such a way that the inner and outer sides of said clutch ring will be contacted with said inner and outer races through the media of sprags inclined at a given angle relative to the axes of said inner and outer races, such that the axial movement of the sprags caused during the clutching and rolling actions will be absorbed by the movement of said clutch ring so as to lessen the shock or impact experienced when the clutch is applied. The device of the present invention is also able to perform the role of roll bearing during idling to markedly lessen wear of the inner and outer races as well as the sprags and eliminate any need of providing roll bearings which were indispensable in the conventional type A clutches. The present device can also reduce the conventional defects concomitant to the axial movement of the inner and outer races at the time of clutching and/or rolling action, so that there is no need of increasing the wall thickness of the inner and outer races as required in the type B clutches.

Any type of sprags available can be used in the present invention, provided that they have a rollable curved surface centered by the axis, but it is usually preferred to use convergent-divergent rollable bodies for the inner sprags and barrel shaped ones for the outer sprags, with a suitable inclination being given to each of these sprags, or the double ball-ended type for both inner and outer sprags. In this case, the clutching face of each of the inner and outer races may be cylindrical or conical, with the bus thereof being rectilinear. Therefore, if the clutch engaging medium is composed of a cylindrical or conical shaft and cylindrical or conical hole combination, there is no need of preparing specific inner and outer races. It is therefore possible, by combining the inner and outer sprags, inner and outer sprag cages, clutch ring and clutch thrust bearing in one set, to greatly facilitate the assembling of the clutch and to realize marked economization in manufacture of the clutches.

Figure 1:
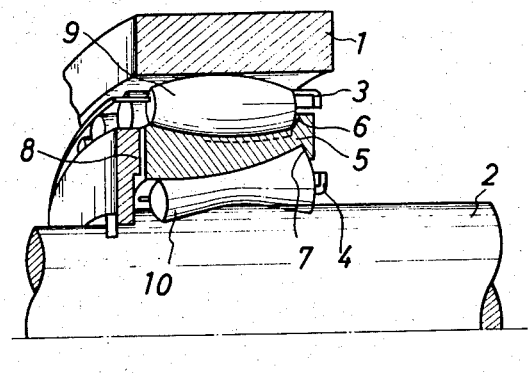
FIG. 1 is a sectional view showing a clutch arrangement in an embodiment of the present invention.

The one-way clutch of the present invention is now described in further detail by way of an embodiment thereof where an inner race having a cylindrical shaft and an outer race having a cylindrical hole are used as shown in FIG. 1. The assembly of FIG. 1 comprises an outer race 1 having a cylindrical hole, an inner race 2 having a cylindrical shaft, an outer sprag cage 3, an inner sprag cage 4, a clutch ring 5 provided with guide flanges 6 and 7 adapted to serve as roll bearing during free rotation, a clutch ring thrust bearing 8, outer sprags 9 and inner sprags 10.

The principles in operation and arrangement of these component parts are as follows:

1. The outer and inner peripheral sprags 9 and 10 are inclined in the same direction relative to the axes of the clutching faces of the outer and inner races 1 and 2 in concordance with the given clutching direction;
2. Sprags must be contacted at more than two locations on the clutching faces of the outer and inner races 1, 2 and clutch ring to ensure stabilized inclination at all times;
3. The sprags 9, 10 may be of any desired shape provided that it has a rolling face of a certain segment about the axis, but selection of the shape must be made by taking into account the rolling action, torque capacity of the clutch, workability, pattern of use, and other like factors.
4. The clutch ring 5 must have a conoidal configuration with its thickness being increased from one side to the other. Otherwise, no drawing action at the time of clutching nor rolling action during free rotation will be provided.
5. Sprag cages 3, 4 are designed to be servable as roll bearing and to also prepare guide flanges 6, 7 and thrust bearing 8 designed to ensure prevention of accidental removal of the sprags and smooth rotation of the clutch ring.

If these five principles are observed, the desired one-way clutch function will be provided.

Now, the clutching and rolling actions brought about by the above-described arrangement of the component parts are discussed.

Figure 3:
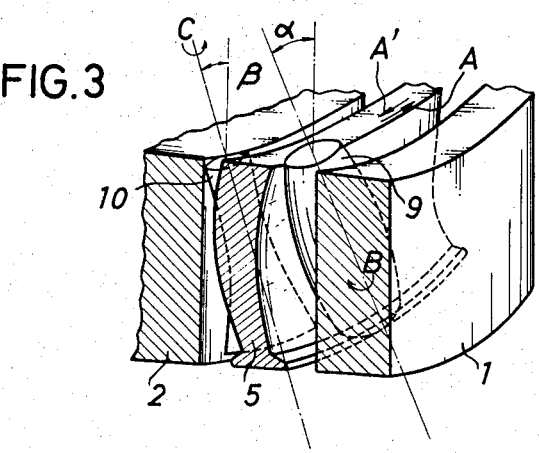
FIG. 3 is a perspective view, partly shown in section, illustrating the modes of operation of the respective component members.

Referring to FIG. 3, let it be assumed that the sprags 9 and 10 are fitted in position iwth inclinations of $\alpha$ and $\beta$, respectively, and that the clutch ring 5 is formed conically with its thickness enlarged upwardly in the drawing. Under this condition, if the clutch ring 5 is rotated in the direction of arrow A, the sprags 9 and 10 are caused to rotate in the directions of arrows B and C, respectively, so that they are rolled down toward the thinner side of the clutch ring 5. If this situation is examined from the angle of the inner and outer races 2 and 1, the clutch ring 5 is forced out upwardly in the direction where spaces are created, and is therefore caused to roll in a substantially no-load condition. If the clutch ring 5 is rotated in the direction of arrow A', the inner and outer sprags 10 and 9 act to drag in the clutch ring 5 downwardly as far as no axial slippage is caused on the inner and outer sprags 10 and 9. In this case, since the clutch ring 5 is so shaped that its thickness is gradually increased toward its top part, there is produced a situation as if a wedge has been driven in between the inner and outer peripheral sprags 10 and 9, and hence the entire component parts are integrally combined, that is, clutched.

As will be appreciated from the foregoing explanation, both rolling and clutching actions exert no influence to the inner and outer races 1 and 2 and is effected merely by axial rolling movement of the inner and outer peripheral sprags relative to the clutch ring.

In the foregoing discussion, the behavior of the clutch ring 5 was discussed to explain the rolling and clutching actions for simplifying the explanation, but in practical uses, the outer race 1 or the inner race 2 is rotated to give rotation to either of the inner peripheral sprag 10 or the outer peripheral sprag 9, causing corresponding rotation of the clutch ring 5 and other sprags 9 or 10, so that the same actions as described above are produced.

Figure 4:
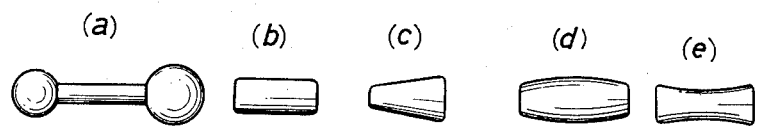
FIG. 4 is front views of various types of sprags usable in the present invention.

As for the configurations of the sprags 9 and 10 used, it is possible to use any configurations if they have a rolling face of a certain segment about the axis as mentioned before, but actually, it is usually preferred to use the rolling bodies such as employed in roll bearing. In FIG. 4 are shown some typical examples of preferred roller configurations, (a) showing a double ball-ended roller, (b) a cylindrical roller, (c) a conoidal roller, (d) a barrel shaped roller, and (e) a convergent-divergent roller. These rollers can be used in combination as inner and outer peripheral sprags, and selection of either of these rollers determines by itself the configurations of the inner and outer races as well as the clutching faces of the clutch ring to be used. It can also decide whether the inner and outer races must be prepared in set or such races can be dispensed with.

Figure 2:
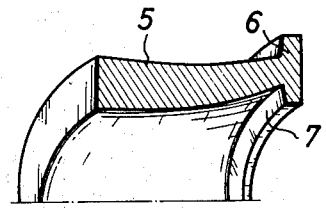
FIG. 2 is a sectional view showing the configuration of a clutch ring used in the assembly of FIG. 1.
Figure 5:
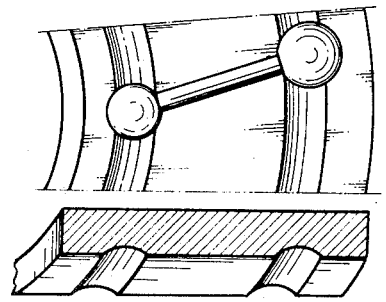
FIG. 5 is a perspective view illustrating a manner of use of a sprag in case double ball-ended sprags were used in the present invention, and a sectional view showing the sprag guide grooves.
Figure 6:
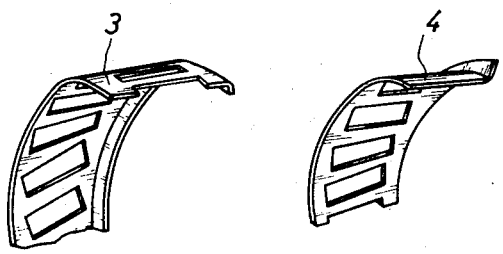
FIG. 6 is perspective views of sprag cages.

Here, the matters to be observed in use of either of these rollers are briefly described. In case of using the double ball-ended rollers (a), the ball grooves must be provided on the clutching face at a pitch smaller by the amount of roller inclination that the distance between the cores of the two balls to thereby stabilize the inclination (see FIG. 5). In the case of (b) and (c), both the inner and outer peripheral faces of the clutch ring must be formed into hyperboloid of one sheet corresponding to the amount of inclination of the sprags. Naturally, the inner and outer races 1 and 2 must be manufactured in set. Otherwise, every counterpart shaft and counterpart housing must be also worked into hyperboloid of one sheet. In the case of (d), if this is used on the inner peripheral face, the inner peripheral face may be cylindrical or conical face, and in the case of (e), if this is used on the outer peripheral face, the outer peripheral face may be cylindrical or conical face. But, if they are used reversed, a corresponding hyperboloid of one sheet must be provided. Therefore, when utilizing the cylindrical face on the counterpart shaft and cylindrical hole in the counterpart housing, the arrangement may be such as shown in FIG. 1, using barrel shaped rollers (d) for the outer peripheral sprags 9 and convergent-divergent rollers (e) for the inner peripheral sprags 10. In this case, both inner and outer surfaces of the clutch ring take the shape of hyperboloid of one sheet as shown in FIG. 2.

When this one-way clutch works as roll bearing, the inner and outer peripheral sprags are rolled out toward the thinner side of the clutch ring, so that it needs to provide means for stopping and guiding them. To this end, guide flanges such as shown by numerals 6 and 7 in FIG. 1 are provided. Although such guide flanges can prevent dislocation or removal of the sprags, they are not sufficient to check the entire assembly of clutch ring 5 and sprags 9, 10 from coming out in the opposite direction, so it is desirable to provide a clutch ring thrust bearing such as illustrated in FIG. 1 with numeral 8.

According to the present invention, as described above, any axial movement of the sprags during the clutching performance is absorbed by the clutch ring, so that the inner and outer races 1 and 2 remain perfectly unaffected by the clutching action and also the structure of the device can be made small and simple for the required torque, and hence there can be obtained an excellent one-way clutch which is easy to assemble and handle, low in cost and high in durability.

What is claimed is:

1. A one-way clutch comprising an inner race, an outer race having an inner surface parallel to the axial direction thereof, a conoidal frame-like clutch ring shaped so as to increase in thickness from one side to the other relative to the axial direction of said inner and outer races and mounted between said inner and outer races, a plurality of sprags inclined at a certain predetermined angle relative to the axial direction of said inner and outer races and mounted between said inner and outer races and said clutch ring, so that any relative rotational movement of said inner and outer races in a first direction causes rolling action and rotation in the opposite direction causes locking action which is absorbed by said clutch ring.

2. A one-way clutch according to claim 1, in which guide flanges are provided on the reduced thickness side of said clutch ring and a thrust bearing mounted adjacent the thick side of said clutch ring.

3. A one-way clutch as defined in claim 1 including a pair of sprag cages in which said sprags are supported.

4. A one-way clutch according to claim 1, in which said clutch ring is formed into a conoidal frame-like structure.

5. A one-way clutch according to claim 1, wherein said sprags are double-ball ended rollers having different sizes.

* * * * *